(12) United States Patent
Freitag et al.

(10) Patent No.: US 7,268,977 B2
(45) Date of Patent: Sep. 11, 2007

(54) CAPPING LAYERS WITH HIGH COMPRESSIVE STRESS FOR SPIN VALVE SENSORS

(75) Inventors: James M. Freitag, San Jose, CA (US); Mustafa M. Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 439 days.

(21) Appl. No.: 10/779,356

(22) Filed: Feb. 12, 2004

(65) Prior Publication Data

US 2005/0180057 A1 Aug. 18, 2005

(51) Int. Cl.
*G11B 5/39* (2006.01)
(52) U.S. Cl. .................................. 360/324.1
(58) Field of Classification Search ............. 360/324.1, 360/324.11, 324.12
See application file for complete search history.

(56) References Cited

U.S. PATENT DOCUMENTS

| | | | |
|---|---|---|---|
| 4,825,325 A | 4/1989 | Howard | 360/113 |
| 5,465,185 A | 11/1995 | Heim et al. | 360/113 |
| 5,998,016 A | 12/1999 | Sasaki et al. | 428/336 |
| 6,208,491 B1 | 3/2001 | Pinarbasi | 360/324.1 |
| 6,268,985 B1 | 7/2001 | Pinarbasi | 360/324.12 |
| 6,341,052 B2 | 1/2002 | Hayashi | 360/324.1 |
| 6,369,993 B1 | 4/2002 | Hayashi | 360/327.2 |
| 6,452,385 B1 | 9/2002 | Shimazawa et al. | 324/252 |
| 6,517,896 B1 | 2/2003 | Horng et al. | 427/123 |
| 6,624,987 B1 | 9/2003 | Hayashi et al. | 360/324.2 |
| 2002/0048127 A1 | 4/2002 | Fukuzawa et al. | 360/324.1 |
| 2002/0196589 A1 | 12/2002 | Gill | 360/324.1 |
| 2003/0030944 A1 | 2/2003 | Lin et al. | 360/324.1 |
| 2003/0128481 A1 | 7/2003 | Seyama et al. | 360/324.1 |
| 2003/0214761 A1 | 11/2003 | Freitag et al. | 360/322 |

FOREIGN PATENT DOCUMENTS

| | | |
|---|---|---|
| JP | 6-104505 | 4/1994 |
| JP | 2001126219 | 5/2001 |

*Primary Examiner*—Hoa T. Nguyen
*Assistant Examiner*—Mark Blouin
(74) *Attorney, Agent, or Firm*—Silicon Valley Patent Group LLP

(57) ABSTRACT

A capping layer employed with a spin valve sensor includes a first capping layer, formed from a refractory metal, and a second capping layer formed from silicon. The interface between the refractory metal layer and the silicon layer form a silicide that provides a large compressive stress on the underlying spin valve sensor. The compressive stress, advantageously, increases the pinning field in the self-pinned pinned layer structure, while providing a high resistivity so that less sense current is shunted by the capping layer structure compared to an all metal capping layer structure that provides a comparable compressive stress.

25 Claims, 2 Drawing Sheets

CAPPING LAYERS WITH HIGH COMPRESSIVE STRESS FOR SPIN VALVE SENSORS

FIELD OF THE INVENTION

The present invention relates to a magnetoresistive spin valve sensor, and in particular to a self-pinned spin valve sensor with a capping layer structure that provides high compressive stress.

BACKGROUND

A magnetic head assembly typically includes write and read heads wherein the write head writes magnetic bits of information into a rotating magnetic disk in a disk drive and the read head reads the magnetic bits of information from the rotating disk. The magnetic head assembly is typically located on a slider that "flies" over a rotating magnetic disk on a cushion of air between the disk surface and the air bearing surface of the slider.

The read head typically includes a spin valve sensor and two lead layers that are connected to the side edges of the spin valve sensor through which a sense current is conducted. The spin valve sensor and leads are located between a pair of nonmagnetic electrically insulative gap layers and a pair of ferromagnetic shield layers.

In general, a spin valve sensor has a pinned ferromagnetic structure in close proximity to a free ferromagnetic layer. The direction of magnetization in the pinned ferromagnetic structure is fixed or "pinned", in a specified direction. Some spin valve sensors use an adjoining antiferromagnetic layer to pin the direction of the pinned ferromagnetic structure and some spin valve sensors use self-pinned ferromagnetic structures, which do not use an antiferromagnetic pinning layer. A self-pinned ferromagnetic layer typically includes two ferromagnetic layers that provide large coercivity and a strong anitstropy field that obviate the antiferromagnetic pinning layer.

The direction of magnetization in the free layer is responsive to the external magnetic field to which the read element is subjected. The magnetization in the free layer is usually partially stabilized with adjacent permanent magnets. The relative directions of the magnetization in the pinned layer and the free layer determines the resistance of the read element.

In a self-pinned sensor design, the magnetic anisotropy caused by the positive magnetostriction of the pinned layers together with a compressive film stress aligns the magnetization of the pinned layers in a direction perpendicular to the air bearing surface of the slider, which is the desired state for a spin valve. The anisotropy field $H_k$ for a given magnetostriction $\lambda$ and film stress $\sigma$ is given by the equation:

$$H_k = 3 * \lambda * \frac{\sigma}{M} \qquad \text{eq. 1}$$

where M is the saturation moment of the pinned layers. To increase the pinning field $H_k$ in the pinned layers, it is desirable to increase the compressive stress $\sigma$ of the film.

The use of a metal capping layer provides a large compressive stress. For a capping layer of a thickness t and with stress $\sigma'$, the bending moment exerted by the capping layer on the underlying sensor layers, which causes a stress to develop in these layers, will be proportional to the force per unit width (F/w) of the capping layer:

$$F/W = \sigma'*t \qquad \text{eq. 2}$$

which is proportional to the thickness of the film. Thus, one method to further increase the pinning field $H_k$ in the pinned layers is to use a thicker capping layer. A thicker capping layer will produce larger bending moments and, consequently, more stress in the underlying sensor. Unfortunately, by increasing the thickness of a metallic capping layer, more sense current is shunted by the capping layer, which leads to a significant decrease in sensor performance. Further, significantly increasing the thickness of the capping layer is undesirable because of the increase in sensor size.

Accordingly, what is needed is an improved capping layer with a large compressive stress and high electrical resistivity.

SUMMARY

A capping layer, in accordance with an embodiment of the present invention, includes a first capping layer, formed from a refractory metal, and a second capping layer formed from silicon. The interface between the refractory metal layer and the silicon layer form a silicide that provides a large compressive stress on the underlying spin valve sensor. The compressive stress, advantageously, increases the pinning field in the self-pinned pinned layer structure, while providing a high resistivity so that less sense current is shunted by the capping layer structure compared to an all metal capping layer structure that provides a comparable compressive stress.

In one embodiment of the present invention, a spin valve sensor includes a ferromagnetic free layer structure, a ferromagnetic pinned layer structure, and a nonmagnetic spacer layer located between the free layer structure and the pinned layer structure. The spin valve sensor also includes a capping layer structure including a refractory metal layer and a silicon layer, wherein the refractory metal layer is disposed between the free layer structure and the silicon layer.

In another embodiment of the present invention, an apparatus includes a spin valve sensor, the spin valve sensor includes a ferromagnetic free layer structure, a ferromagnetic pinned layer structure, and a nonmagnetic electrically conductive spacer layer located between the free layer structure and the pinned layer structure. The spin valve sensor further includes a capping layer structure comprising a first capping layer a second capping layer, the first capping layer located between the second capping layer and the pinned layer structure, the first capping layer interfacing with the second capping layer to form a silicide that provides a compressive stress on the pinned layer structure.

In another embodiment of the present invention, a method of making a spin valve sensor for a magnetic head assembly includes forming a pinned layer structure, forming a nonmagnetic electrically conductive spacer layer on the pinned layer structure, and forming a ferromagnetic free layer structure on the spacer layer. The method includes forming a capping layer structure by forming a first capping layer of a refractory metal, and forming a second capping layer of silicon on the first capping layer, wherein the first capping layer is located between the pinned layer structure and the second capping layer structure, and wherein a silicide is formed at the junction of the first capping layer and the second capping layer.

DETAILED DESCRIPTION

In accordance with an embodiment of the present invention, a capping layer structure is used to enhance the compressive stress of a self-pinned spin valve sensor that may be used in a magnetic disk drive or similar type of device.

Figure 1:
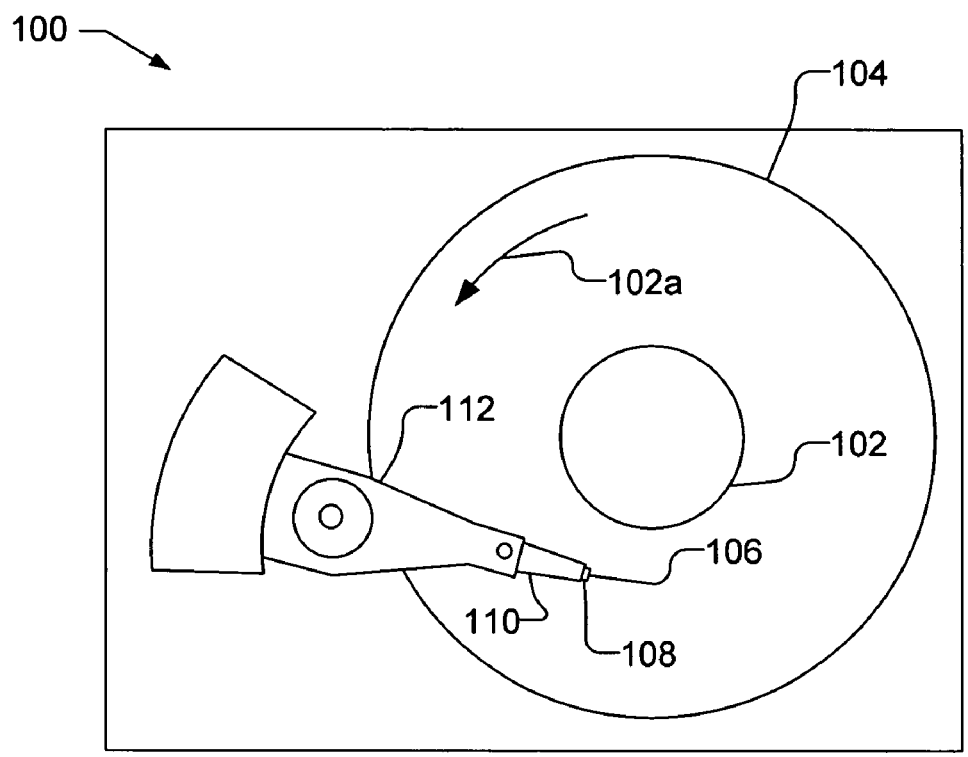
FIG. 1 illustrates a magnetic disk drive with which a spin valve sensor with a capping layer structure, in accordance with an embodiment of the present invention, may be used.

FIG. 1 illustrates a magnetic disk drive 100 with which a self-pinned spin valve sensor with a capping layer structure, in accordance with an embodiment of the present invention, may be used. The drive 100 includes a spindle 102 that supports and rotates a magnetic disk 104. A combined read and write magnetic head assembly 106 is mounted on a slider 108 that is supported by a suspension 110 and an actuator arm 112. If desired, a plurality of disks, sliders and suspensions may be employed in a large capacity direct access storage device. The suspension 110 and actuator arm 112 position the slider 108 so that the magnetic head assembly 106 is in a transducing relationship with a surface of the magnetic disk 104. When the disk 104 is rotated as indicated by arrow 102a, the slider 108 is supported on a thin (e.g., 0.05 μm) cushion of air (air bearing) between the surface of the disk 104 and the air bearing surface of the slider 108. The magnetic head assembly 106 may then be employed for writing information to multiple circular tracks on the surface of the disk 104, as well as for reading information therefrom.

Figure 2:
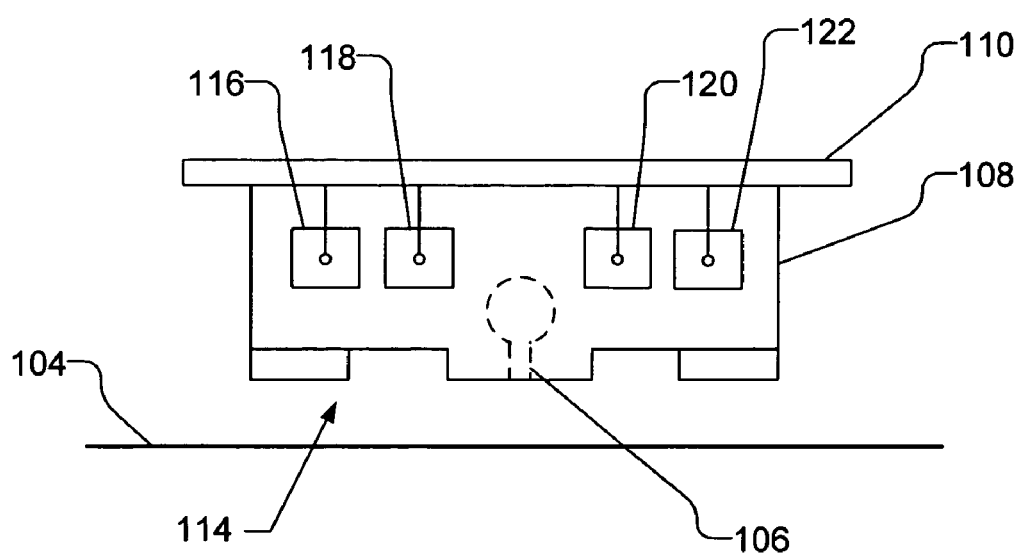
FIG. 2 shows an end view of a slider with a magnetic head assembly mounted on a suspension over the surface of a rotating magnetic disk.

FIG. 2 shows an end view of the slider 108 mounted on suspension 110 over the surface of the disk 104. As discussed above, the slider 108 is supported over the rotating disk 104 by an air bearing between the surface of the disk 104 and the air bearing surface 114 of the slider 108. As illustrated in FIG. 2, the magnetic head assembly 106 is mounted at the end of the slider 108 along with solder connections 116, 118, which connect leads from the write element of the magnetic head assembly 106 to leads on the suspension 110 (not shown), and solder connections 120, 122, which connect leads from the read element (i.e., the spin valve sensor) of the magnetic head assembly 106 to leads on the suspension 110 (not shown).

Figure 3:
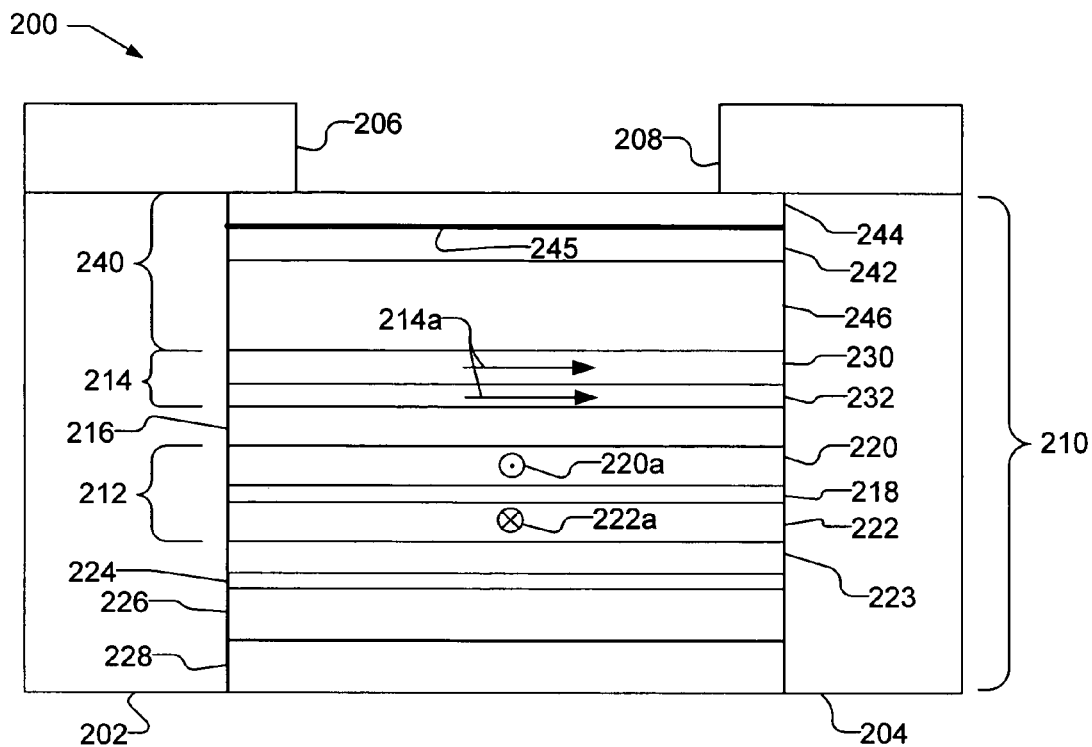
FIG. 3 illustrates a read element that includes a spin valve sensor in accordance with an embodiment of the present invention and which may be used in the magnetic head assembly shown in FIG. 2.

FIG. 3 illustrates a read element 200 that includes a spin valve sensor 210, which may be used in the magnetic head assembly 106. Typically, there are two permanent magnets 202, 204 that provide magnetic biasing to the sensor 210. The read element 200 also has two electrical leads 206, 208, which overlay the end portions of the sensor 210. Typically, the read element 200 is between read gap layers (not shown).

The sensor 210 includes a pinned layer structure 212, a free layer structure 214 and a spacer layer 216 there between. The pinned layer structure 212 includes a coupling layer 218 between a first and second antiparallel pinned layers 220 and 222. The pinned layers 220 and 222 are ferromagnetic layers with magnetic moments 220a, and 222a, which are out of and into the sensor 210, respectively, i.e., normal to the air bearing surface of the slider. The pinned layer structure 212 is deposited over seed layered 224, 226 and 228.

The free layer structure 214 includes first and second free ferromagnetic layers 230 and 232. The free layer structure 214 has a magnetic moment 214a that is parallel to the air bearing surface of the slider. When a signal from the rotating magnetic disk rotates the magnetic moment 214a of the free layer structure into the sensor, the magnetic moments 220a and 222a become more antiparallel, which increases the resistance of the sensor, and when the signal field from the rotating magnetic disk rotates the magnetic moment 214a of the free layer structure out of the sensor, the magnetic moments 220a and 222a become more parallel, which decreases the resistance of the sensor. By measuring and processing the changes in resistance in the sensor by passing a sense current through the sensor, the data on the disk can be determined.

A capping layer structure 240, in accordance with an embodiment of the present invention, is then formed over the free layer structure 214. The capping layer structure 240 includes at least two layers that enhance the compressive stress of the sensor. The capping layer structure 240 includes a layer 242 of a refractory metal, such as ruthenium, molybdenum, tungsten, tantalum, niobium, chromium, vanadium and rhenium, over which is deposited a layer 244 of silicon. The capping layer structure 240 may also include an underlying protective metal layer 246, such as tantalum. The refractory metal layer 242 and silicon layer 244 may be deposited by conventional means, such as plasma vapor deposition and/or sputtering.

Table 1 provides exemplary materials and thickness for the layers of the sensor 210.

TABLE 1

| LAYER # | MATERIAL | THICKNESS (Å) |
|---------|----------|---------------|
| 244 | Si | 15 |
| 242 | Ru | 15 |
| 246 | Ta | 40 |
| 230 | NiFe | 15 |
| 232 | CoFe | 10 |
| 216 | Cu | 18.5 |
| 220 | CoFe | 17 |
| 218 | Ru | 8 |
| 222 | CoFe | 17 |
|  | PtMn | 4-50 |
| 224 | NiFe | 8 |
| 226 | NiFeCr | 25-50 |
| 228 | $Al_2O_3$ | 30 |

It should be understood that the materials and thickness provided in Table 1 are merely exemplary. Alternative materials and thicknesses may be used if desired. For example, the refractory metal layer 242 and silicon layer 244 may have a thickness range of 5 Å to 30 Å. Moreover, additional or fewer layers may be included in the sensor if desired.

The deposition of the silicon layer 244 on the refractory metal layer 242 forms a silicide, illustrated in FIG. 3 as line 245, due to a diffusion process in which silicon is the active diffusion species. The atomic volume of the silicide is greater than the atomic volume of the refractory metal alone. When silicon is deposited on a refractory metal, the crystalline matrix of the refractory metal must swell to accommodate the increased volume of the silicide. The expansion of the refractory metal will cause a large compressive stress in the silicide.

Figure 4:
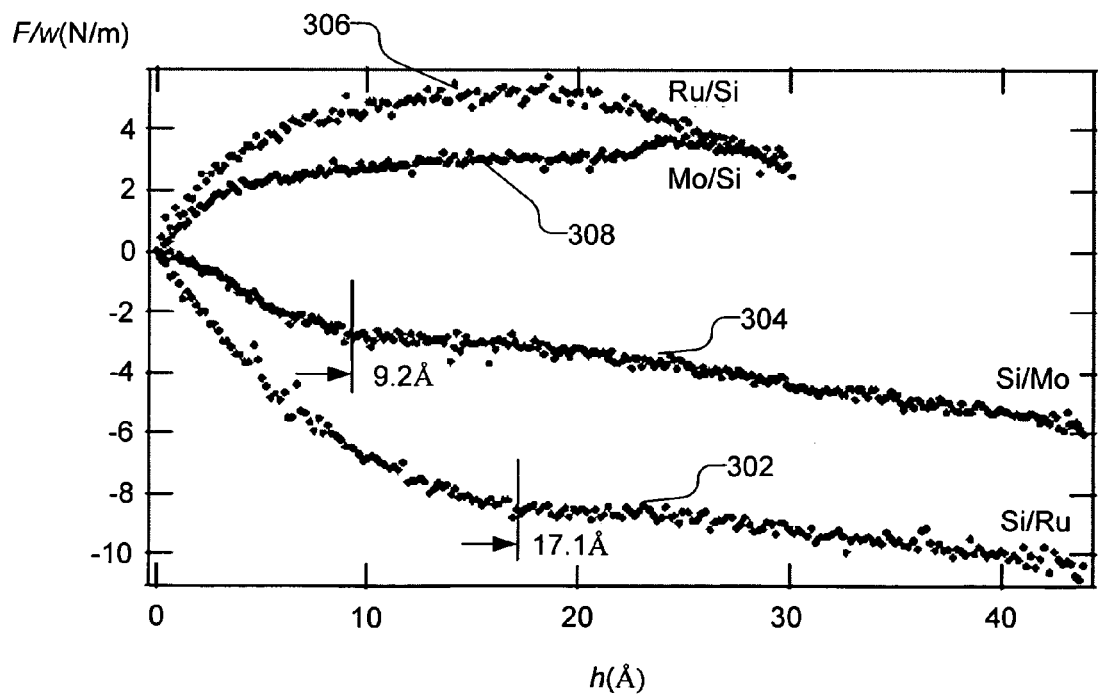
FIG. 4 is a graph illustrating the compressive stress that results when silicon is deposited on refractory metals, such as ruthenium or molybdenum.

FIG. 4 is a graph illustrating the compressive stress that results when a silicide is formed from silicon and refractory metals, ruthenium or molybdenum. FIG. 4 shows in-situ stress measurements of the compressive stress as F/w vs. film thickness for silicon deposited on ruthenium (line 302), molybdenum (line 304) and for ruthenium deposited on silicon (line 306) and molybdenum deposited on silicon (line 308) with a sputtering pressure of 1.5 mT. As can be seen in FIG. 4, for the case of ruthenium (line 302), during the first 17.1 Å of Si deposition, F/w changes by approximately −8.5 N/m (compressive), which amounts to a stress of −5 Gpa (compressive) in the silicide layer 245. A conventional capping layer structure that provides a comparable compressive stress would need to be much thicker, and thus, would shunt a considerable amount of sense current and would increase the size of the spin valve sensor.

Thus, the use of a silicon layer 244 deposited over the refractory metal layer 242, in accordance with an embodiment of the present invention produces a large compressive stress due to the formation of the silicide 245. Moreover, the resulting structure also has a high resistivity. Consequently, the capping layer structure 240 will shunt less sense current while providing increased compressive stress, which advantageously increases the pinning field $H_k$ as described in equation 1.

Although the present invention is illustrated in connection with specific embodiments for instructional purposes, the present invention is not limited thereto. Various adaptations and modifications may be made without departing from the scope of the invention. For example, different refractory metals and layer thicknesses may be used in the capping layer structure. Moreover, the structure and thicknesses of the spin valve sensor may vary as desired. Further, different types of spin valve sensors may be used with the capping layer structure. For example, the spin valve sensor may use an antiferromagnetic pinning layer for pinning the magnetic moment of the pinned layer structure. Further, the capping layer structure may be used with a top spin valve sensor, i.e., a sensor with the pinned layer structure disposed between the free layer structure and the capping layer structure. Therefore, the spirit and scope of the appended claims should not be limited to the foregoing description.

What is claimed is:

1. A spin valve sensor comprising:
a ferromagnetic free layer structure;
a ferromagnetic pinned layer structure;
a nonmagnetic spacer layer located between the free layer structure and the pinned layer structure; and
a capping layer structure including a refractory metal layer and a silicon layer consisting of silicon, wherein the refractory metal layer is disposed between the free layer structure and the silicon layer.

2. The spin valve sensor of claim 1, wherein the refractory metal layer is selected from a group consisting of ruthenium and molybdenum.

3. The spin valve sensor of claim 1, wherein the refractory metal layer has a thickness in a range of 5 Å to 30 Å and the silicon layer has a thickness in a range of 5 Å to 30 Å.

4. The spin valve sensor of claim 1, wherein the refractory metal layer has a thickness of approximately 15 Å and the silicon layer has a thickness of approximately 15 Å.

5. The spin valve sensor of claim 1, further comprising a protective metal layer interfacing the free layer structure and disposed between the refractory metal layer and the free layer structure.

6. The spin valve sensor of claim 5, wherein the protective metal layer is formed from tantalum.

7. The spin valve sensor of claim 5, wherein the protective metal layer has a thickness in a range of 25 Å to 50 Å.

8. The spin valve sensor of claim 1, wherein a silicide is formed between the refractory metal layer and the silicon layer.

9. The spin valve sensor of claim 1, wherein the pinned layer structure is a self-pinned pinned layer structure that comprises:
a first ferromagnetic pinned layer and a second ferromagnetic pinned layer, wherein the first ferromagnetic pinned layer is pinned in a first direction and the second ferromagnetic pinned layer is pinned in second direction that is antiparallel to the first direction; and
a coupling layer located between the first ferromagnetic pinned layer and the second ferromagnetic pinned layer.

10. The spin valve sensor of claim 1, wherein the free layer structure is located between the spacer layer and the capping layer structure.

11. An apparatus comprising a spin valve sensor, the spin valve sensor comprising:
a ferromagnetic free layer structure;
a ferromagnetic pinned layer structure;
a nonmagnetic electrically conductive spacer layer located between the free layer structure and the pinned layer structure; and
a capping layer structure comprising a first capping layer and a second capping layer, the first capping layer located between the second capping layer and the pinned layer structure, the first capping layer interfacing with the second capping layer to form a suicide that provides a compressive stress on the pinned layer structure.

12. The apparatus of claim 11, wherein the first capping layer is formed from a refractory metal.

13. The apparatus of claim 12, wherein the refractory metal is selected from a group consisting of ruthenium and molybdenum.

14. The apparatus of claim 12, wherein the refractory metal layer has a thickness in a range of 5 Å to 30 Å and the silicon layer has a thickness in a range of 5 Å to 30 Å.

15. The apparatus of claim 12, wherein the refractory metal layer has a thickness of approximately 15 Å and the silicon layer has a thickness of approximately 15 Å.

16. The apparatus of claim 11, wherein the second capping layer is formed from silicon.

17. The apparatus of claim 11, wherein the spin valve sensor further comprises a protective metal layer disposed between the first capping layer and the pinned layer structure.

18. The apparatus of claim 17, wherein the protective metal layer interfaces the free layer structure and the first capping layer interfaces the protective metal layer.

19. The apparatus of claim 11, wherein free layer structure is located between the pinned layer structure and the capping layer structure.

20. The apparatus of claim 11, wherein the apparatus is a magnetic head assembly.

21. A method of making a spin valve sensor for a magnetic head assembly, the method comprising:
 forming a pinned layer structure;
 forming a nonmagnetic electrically conductive spacer layer on the pinned layer structure;
 forming a ferromagnetic free layer structure on the spacer layer; and
 forming a capping layer structure, wherein forming a capping layer structure comprises:
  forming a first capping layer of a refractory metal; and
  forming a second capping layer of silicon on the first capping layer, wherein the first capping layer is located between the pinned layer structure and the second capping layer structure, wherein a silicide is formed at the junction of the first capping layer and the second capping layer.

22. The method of claim 21, further comprising forming a protective metal layer located between the first capping layer and the free layer structure.

23. The method of claim 22, wherein the protective metal layer is formed from tantalum.

24. The method of claim 21, wherein the refractory metal is selected from a group consisting of ruthenium and molybdenum.

25. The method of claim 21, wherein the first capping layer is formed with a thickness in the range of 5 Å to 30 Å and the second capping layer is formed with a thickness in the range of 5 Å to 30 Å.

* * * * *